(12) United States Patent
Ranganathan

(10) Patent No.: US 8,763,363 B2
(45) Date of Patent: Jul. 1, 2014

(54) METHOD AND SYSTEM FOR COOLING FLUID IN A TURBINE ENGINE

(75) Inventor: Srikanth Ranganathan, Mason, OH (US)

(73) Assignee: General Electric Company, Schenectady, NY (US)

( * ) Notice: Subject to any disclaimer, the term of this patent is extended or adjusted under 35 U.S.C. 154(b) by 1105 days.

(21) Appl. No.: 11/774,179

(22) Filed: Jul. 6, 2007

(65) Prior Publication Data

US 2009/0007570 A1    Jan. 8, 2009

(51) Int. Cl.
*F02K 99/00*    (2009.01)

(52) U.S. Cl.
USPC ......... 60/266; 60/267; 60/39.511; 60/39.512; 60/736; 165/121

(58) Field of Classification Search
USPC ................ 60/266, 267, 39.511, 39.512, 736; 165/121
See application file for complete search history.

(56) References Cited

U.S. PATENT DOCUMENTS

| | | | | |
|---|---|---|---|---|
| 3,797,561 A | * | 3/1974 | Clark et al. ................ | 60/39.08 |
| 4,254,618 A | | 3/1981 | Elovic | |
| 5,269,135 A | | 12/1993 | Vermejan et al. | |
| 5,305,616 A | | 4/1994 | Coffinberry | |
| 5,392,614 A | | 2/1995 | Coffinberry | |
| 5,438,823 A | * | 8/1995 | Loxley et al. ............... | 60/39.08 |
| 5,918,458 A | | 7/1999 | Coffinberry et al. | |
| 6,106,229 A | | 8/2000 | Nikkanen | |
| 6,295,803 B1 | | 10/2001 | Bancalari | |
| 6,546,736 B2 | | 4/2003 | Rakhmailov | |
| 6,557,337 B1 | | 5/2003 | Rakhmailov | |
| 6,584,778 B1 | | 7/2003 | Griffiths et al. | |
| 6,931,834 B2 | | 8/2005 | Jones | |
| 7,213,391 B2 | | 5/2007 | Jones | |
| 7,334,411 B2 | * | 2/2008 | Vandermolen ............... | 60/772 |
| 2005/0150970 A1 | | 7/2005 | Beutin et al. | |
| 2005/0235627 A1 | * | 10/2005 | Vandermolen ............ | 60/39.511 |
| 2006/0042225 A1 | * | 3/2006 | Bruno et al. ................. | 60/204 |

FOREIGN PATENT DOCUMENTS

| | | |
|---|---|---|
| EP | 0511770 A1 | 11/1992 |
| EP | 0924409 A2 | 6/1999 |
| GB | 2234805 A | 2/1991 |
| JP | 54-052216 A | 4/1979 |
| JP | 05-125957 A | 5/1993 |
| JP | 11-247668 A | 9/1999 |
| JP | 2001-330381 A | 11/2001 |
| JP | 2005-201264 A | 7/2005 |

OTHER PUBLICATIONS

JP Office Action dated Apr. 17, 2012 from corresponding JP Application No. 2008-174298 along with English translation.
Extended European Search Report, dated Apr. 4, 2014, for copending EP patent application No. EP 08158642 (5 pgs).

* cited by examiner

*Primary Examiner* — Craig Kim
(74) *Attorney, Agent, or Firm* — William Scott Andes, Esq.; Armstrong Teasdale LLP

(57) ABSTRACT

A method of assembling a turbine engine is provided. The method includes providing a heat exchanger having a curvilinear body. The method also includes coupling the heat exchanger to at least one of a fan casing and an engine casing of the turbine engine. The curvilinear body facilitates reducing pressure losses in airflow channeled into the heat exchanger.

20 Claims, 5 Drawing Sheets

METHOD AND SYSTEM FOR COOLING FLUID IN A TURBINE ENGINE

BACKGROUND OF THE INVENTION

The field of the invention relates generally to turbine engines, and more specifically, to methods and systems for cooling fluid in a turbine engine.

At least some known turbine engines use heat exchangers to cool oil that is used during engine operations. Specifically, oil from the engine or its generators is channeled through elements in the heat exchanger, and air from a turbine fan is channeled past the heat exchanger elements to cool the oil. Generally, known heat exchangers include an inlet plenum including a diffuser, a heat exchanger block that includes the heat exchanger elements, and an outlet plenum that may include a plurality of passages that may include valve controls. During operation, fan air is channeled into the inlet plenum and through the heat exchanger block prior to being discharged through the outlet plenum. Oil flowing through the heat exchanger elements is cooled by the fan air. In at least some known turbine aircraft engines, the inlet plenum of the heat exchanger is positioned to receive high pressure air discharged from the fan, and the outlet plenum is positioned to facilitate exhausting the high pressure air outboard. In other known turbine aircraft engines, the inlet and the outlet plenums are both coupled to an engine casing, such that high pressure air discharged from the fan is channeled through the heat exchanger prior to being discharged into the fan air or onto engine compartments.

As is known, the heat transfer capability of the heat exchanger is the greatest in regions having a high heat transfer coefficient, which generally have a significant overlap with regions of local high static pressure defined along the inner walls of the heat exchanger. However, the total pressure of flow passing through the heat exchanger may be decreased due to drag created by the inlet and outlet plenums, and due to passageways formed between the heat exchanger elements. Accordingly, within heat exchangers, high heat transfer capability areas may not be capitalized and therefore, the amount of heat transfer may be reduced.

BRIEF DESCRIPTION OF THE INVENTION

In one embodiment, a method of assembling a turbine engine is provided. The method includes providing a heat exchanger having a curvilinear body. The method also includes coupling the heat exchanger to at least one of a fan casing and an engine casing of the turbine engine. The curvilinear body facilitates reducing pressure losses in airflow channeled into the heat exchanger.

In another embodiment, a heat exchanger for a turbine engine is provided. The heat exchanger includes an inlet, an outlet, and a curvilinear body extending between the inlet and the outlet. The curvilinear body is configured to reduce pressure losses in airflow channeled into the heat exchanger.

In yet another embodiment, a turbine engine is provided. The turbine engine includes an engine casing and a fan casing coupled to and positioned radially outward from the engine casing. The turbine engine also includes a heat exchanger configured to couple to at least one of the fan casing and the engine casing. The heat exchanger includes an inlet, an outlet, and a curvilinear body extending between the inlet and the outlet. The curvilinear body is configured to reduce pressure losses in airflow channeled into the heat exchanger.

DETAILED DESCRIPTION OF THE INVENTION

The present invention comprises a heat exchanger for a turbine engine that is coupled to at least one of a fan casing and an engine casing of the turbine engine. In an exemplary embodiment, the heat exchanger includes a curvilinear body. In one embodiment, an inlet of the heat exchanger is coupled against an inner fan casing, and an outlet of the heat exchanger is coupled against an outer fan casing that is radially outward from the inner fan casing. In another embodiment, the heat exchanger inlet and outlet are coupled against the engine casing.

It should be noted that although the present invention is described with respect to heat exchangers that used in high by-pass turbine engines, one of ordinary skill in the art would understand that the present invention is not limited to being used in high by-pass turbine engines. Rather, the present invention may be used in any engine and/or apparatus requiring heat exchange. For simplicity, the present invention is described herein with respect to cooling oil that flows through the heat exchanger. However, as would be appreciated by one of ordinary skill in the art, the present invention is not limited to cooling oil; but rather, the present invention may be used to cool any fluid.

Figure 1:
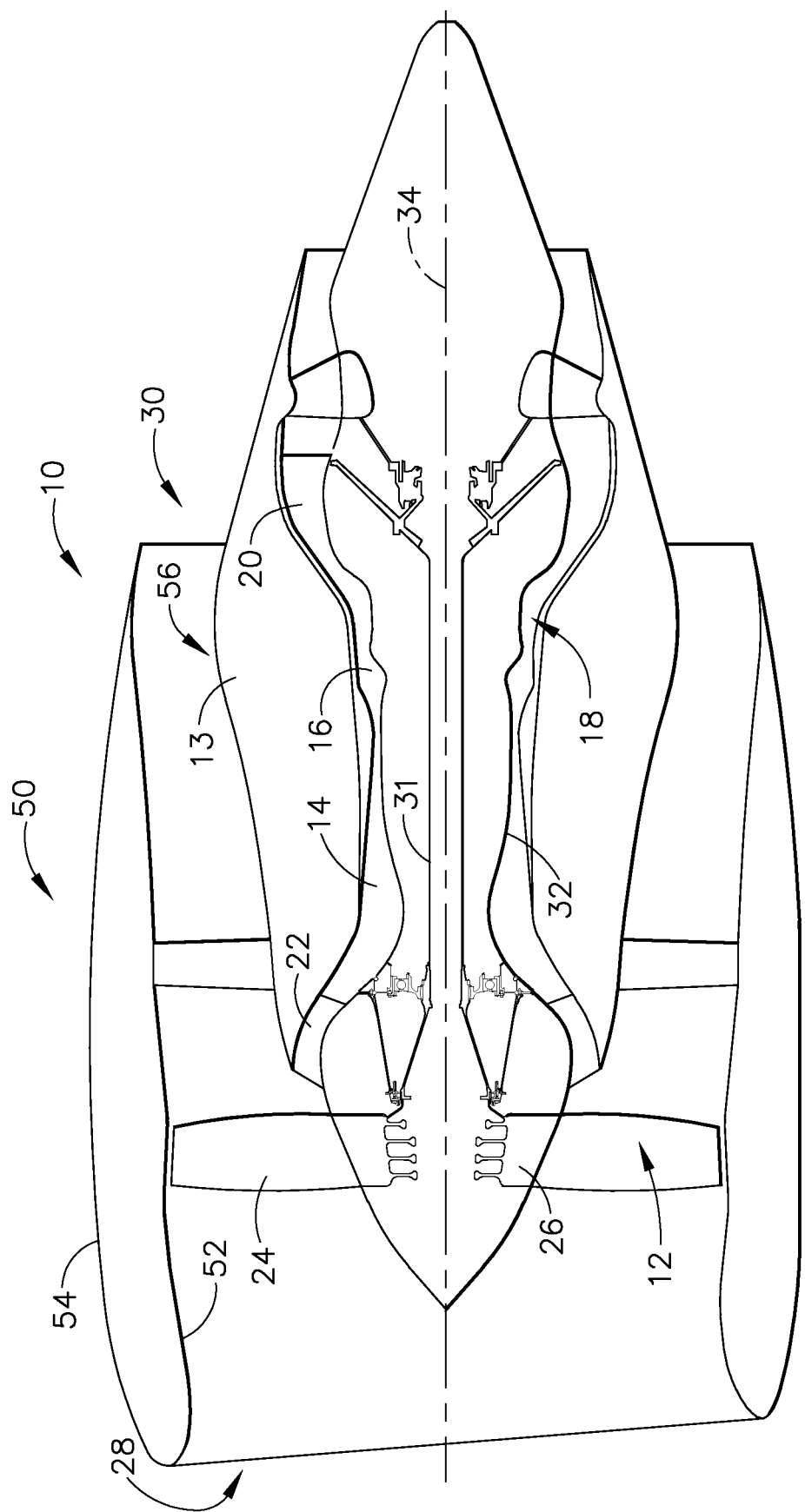
FIG. 1 is a schematic view of an exemplary gas turbine engine.

FIG. 1 is a schematic illustration of an exemplary gas turbine engine 10 that includes a fan assembly 12 and a core engine 13 including a high pressure compressor 14, and a combustor 16 and a high-pressure turbine 18. In the exemplary embodiment, engine 10 also includes a low pressure turbine 20 and a booster 22. Fan assembly 12 includes an array of fan blades 24 that extend radially outward from a rotor disc 26. Engine 10 has an intake side 28 and an exhaust side 30. Fan assembly 12 and turbine 20 are coupled by a first rotor shaft 31, and compressor 14 and turbine 18 are coupled by a second rotor shaft 32. A fan casing 50 is coupled radially outward from and extends circumferentially around fan assembly 12. Fan casing 50 includes a radially inner fan casing 52 and a radially outer fan casing 54. Moreover, an engine casing 56 is coupled to and extends circumferentially around core engine 13.

During operation, airflows through fan assembly 12, along a central axis 34, and compressed air is supplied to high pressure compressor 14. The highly compressed air is delivered to combustor 16. Airflow (not shown in FIG. 1) from combustor 16 drives turbines 18 and 20, and turbine 20 drives fan assembly 12 by way of shaft 31.

Figure 2:
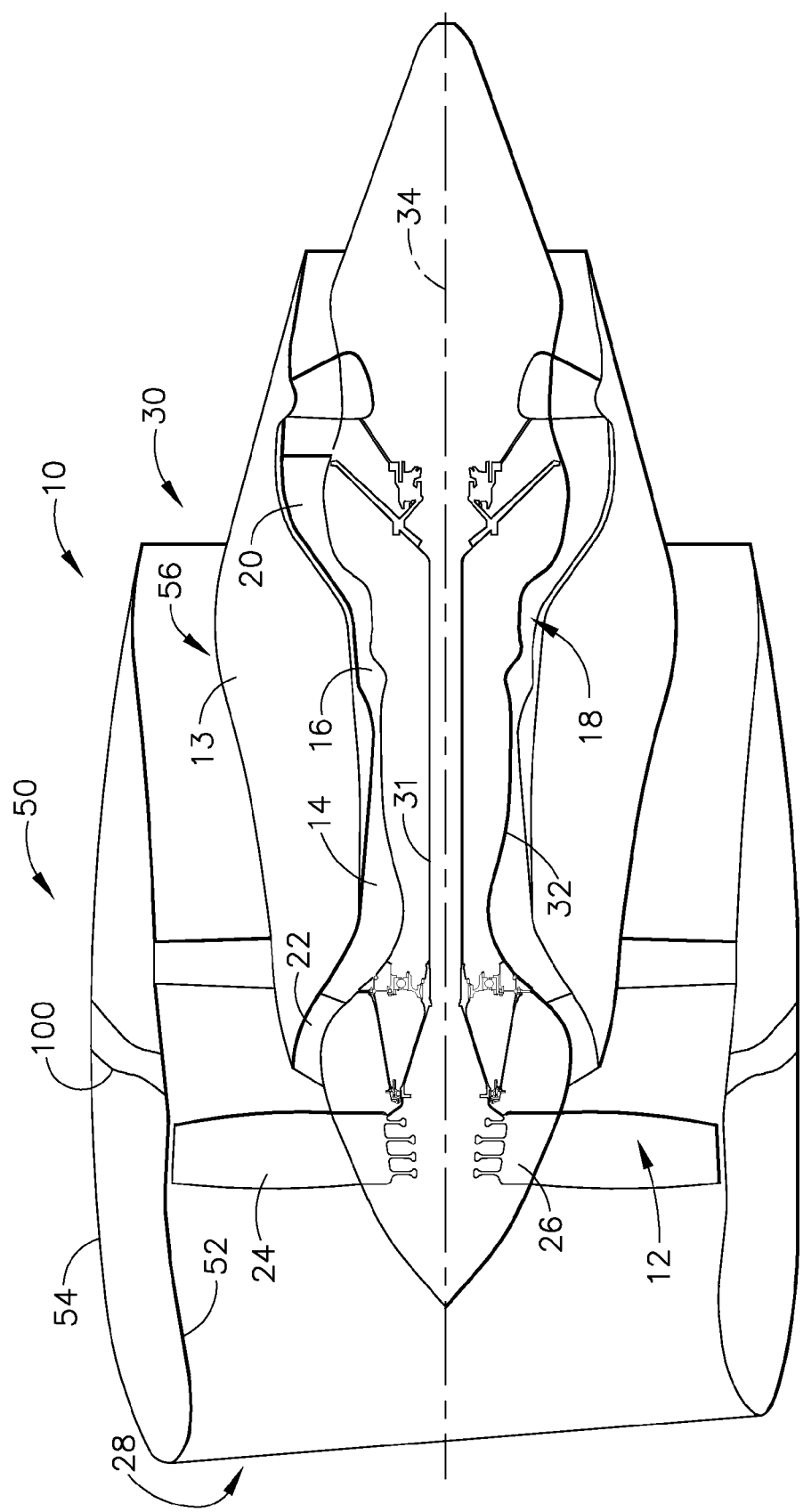
FIG. 2 is a schematic view of the gas turbine engine shown in FIG. 1 including an exemplary heat exchanger coupled between an inner fan casing and an outer fan casing.
Figure 3:
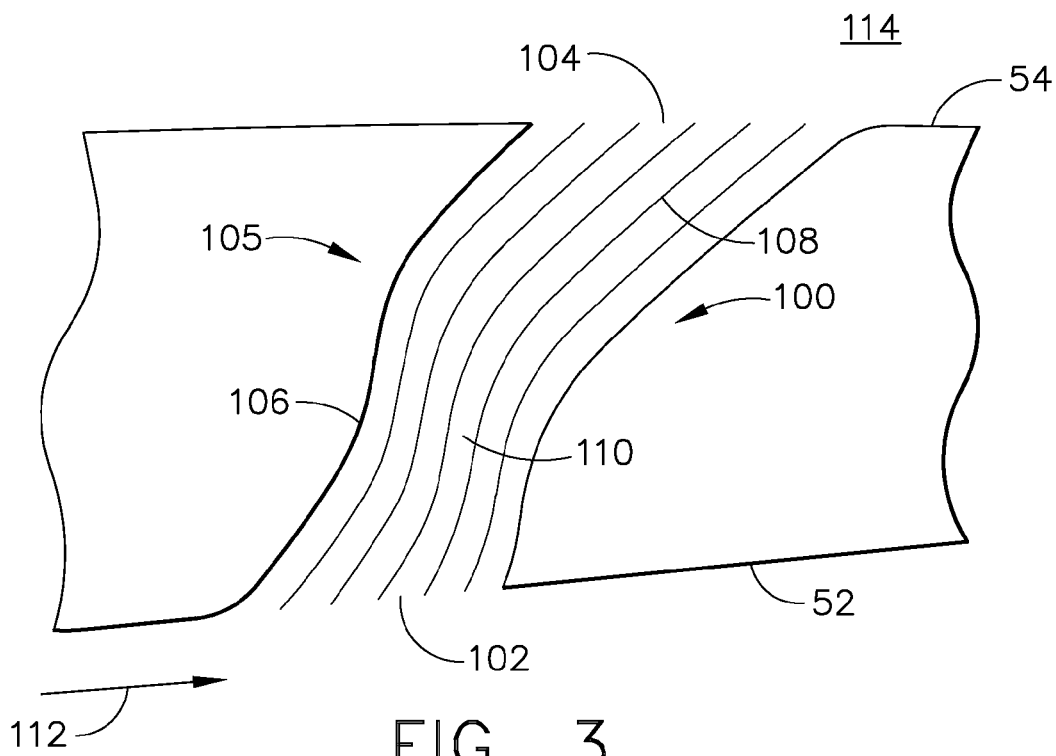
FIG. 3 is an enlarged schematic view of an embodiment of the heat exchanger shown in FIG. 2.
Figure 4:
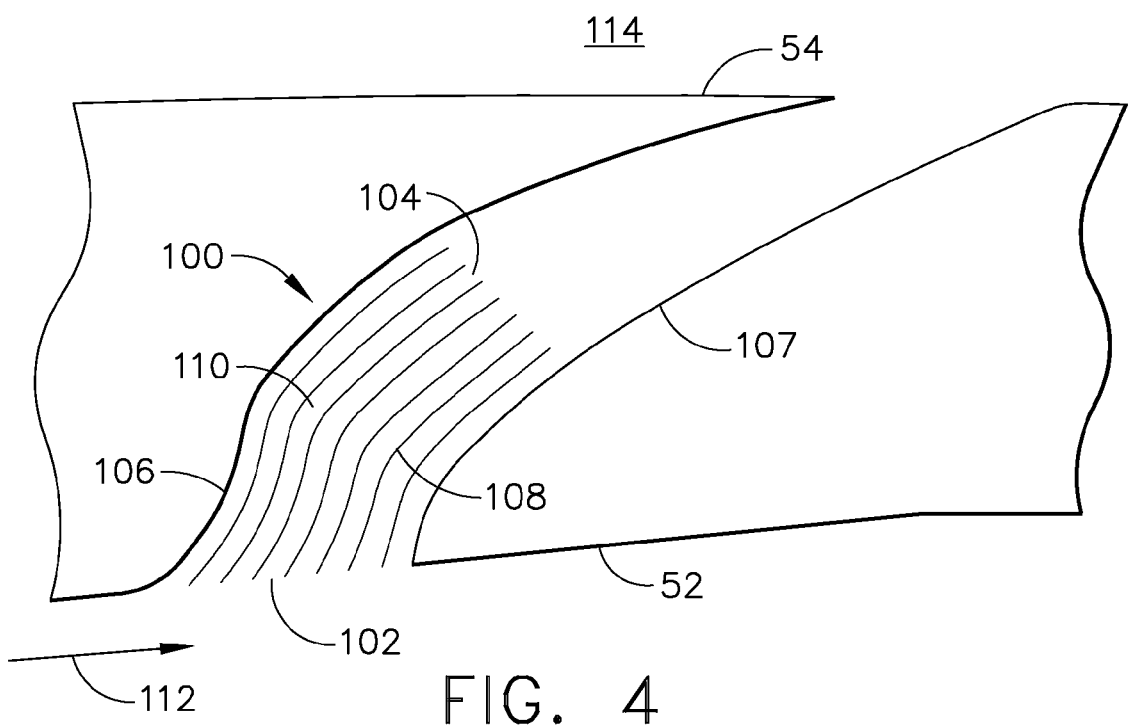
FIG. 4 is an enlarged schematic view of an alternative embodiment of the heat exchanger shown in FIG. 2.

FIG. 2 is a schematic view of gas turbine engine 10 including an exemplary heat exchanger 100 that is coupled between inner fan casing 52 and outer fan casing 54. FIG. 3 is an enlarged schematic view of an embodiment of the heat exchanger shown in FIG. 2. FIG. 4 is an enlarged schematic view of an alternative embodiment of the heat exchanger shown in FIG. 2.

In another exemplary embodiment, heat exchanger 100 includes an inlet 102, an outlet 104, and a curvilinear body 105 that extends between inlet 102 and outlet 104. Specifically, curvilinear body 105 extends between inlet 102 and outlet 104 such that at least one curved portion 106 is defined in curvilinear body 105. In the embodiment illustrated in FIG. 3, and in contrast to other known heat exchangers, inlet 102 is coupled directly to inner fan casing 52 without an inlet plenum and outlet 104 is coupled directly to outer fan casing 54 without an outlet plenum. In the embodiment illustrated in FIG. 4, and in contrast to other known heat exchangers, inlet 102 is coupled directly to inner fan casing 52 without an inlet plenum and outlet 104 is coupled to a curvilinear outlet plenum 107 that is coupled to outer fan casing 54. In the exemplary embodiments, fabricating heat exchanger 100 without an inlet plenum and/or an outlet plenum enables heat exchanger 100 to be coupled to engine 10 without adding as much weight to engine 10 as other known heat exchangers add. Further, fabricating heat exchanger 100 without an inlet plenum and/or an outlet plenum enables drag to occur within heat exchanger 100 while simultaneously exchanging heat within heat exchanger 100.

As will be appreciated by one of ordinary skill in the art, many of the benefits of heat exchanger 100 are a result of curvilinear body 105. Accordingly, in one embodiment, heat exchanger 100 may be fabricated with both an inlet plenum and an outlet plenum, while maintaining many of the benefits described herein. Specifically, in one embodiment, heat exchanger 100 may be fabricated with an inlet plenum and an outlet plenum using methods that are known to those skilled in the art.

A plurality of curvilinear heat exchanger elements 108 extend through curvilinear body 105. More specifically, heat exchanger elements 108 each extend from inlet 102 to outlet 104, and as such, a plurality of passageways 110 are defined between adjacent pairs of heat exchanger elements 108. In one embodiment, heat exchanger elements 108 and passageways 110 are each formed with a curvilinear shape that is substantially similar to the curvilinear shape of curvilinear body 105. In another embodiment, at least one of a size, an orientation, and a relative location of each heat exchanger element 108 is variable. Moreover, in each embodiment, heat exchanger 100 has a smaller volume than known heat exchangers, and as such, adjacent pairs of heat exchanger elements 108 are positioned closer together than in known heat exchangers. Accordingly, passageways 110 are narrower than in known heat exchangers.

In another exemplary embodiment, during operation, oil from engine 10 is channeled through heat exchanger elements 108, and airflow 112 discharged from fan assembly 12 is channeled though heat exchanger 100. In an alternative embodiment, airflow 112 is outboard or ambient air. In contrast to known heat exchangers, airflow 112 is channeled directly into heat exchanger 100 without passing through an inlet plenum or a diffuser. In the exemplary embodiment, airflow 112 is channeled directly into inlet 102 and through passageways 110 to facilitate heat exchange between the oil and airflow 112. Specifically, the oil is facilitated to be cooled as airflow 112 passes through passageways 110 and past heat exchanger elements 108. In the embodiment shown in FIG. 3, spent airflow 112 is discharged from heat exchanger 100 through outlet 104 without passing through an outlet plenum. The spent airflow is discharged to an area 114 external to engine 10. In the embodiment shown in FIG. 4, airflow 112 is discharged through outlet plenum 107 to area 114.

In the exemplary embodiment, as airflow 112 is channeled through heat exchanger 100, passageways 110 facilitate increasing an amount of heat exchange between airflow 112 and the oil. Specifically, passageways 110 are narrow, and therefore, enable a greater amount of contact between heat exchanger elements 108 and airflow 112 while requiring less airflow for heat exchange than in known heat exchangers. Moreover, the curvilinear shape of heat exchanger 100 enables airflow 112 to flow within the curved passageways 110, thereby further increasing contact between airflow 112 and heat exchanger elements 108. In addition, airflow 112 is not diffused or channeled through an inlet plenum while being channeled into heat exchanger 100. Accordingly reverse flow losses, aerodynamic losses, and pressure losses of airflow 112 are facilitated to be reduced within heat exchanger 100. Specifically, in one embodiment, reverse flow losses, aerodynamic losses, and pressure losses of airflow 112 are facilitated to be reduced by as much as 20%.

Accordingly, for the reasons given above, heat exchanger 100 facilitates improving an efficiency of engine 10 thereby reducing time and/or costs associated with maintaining engine 10.

Figure 5:
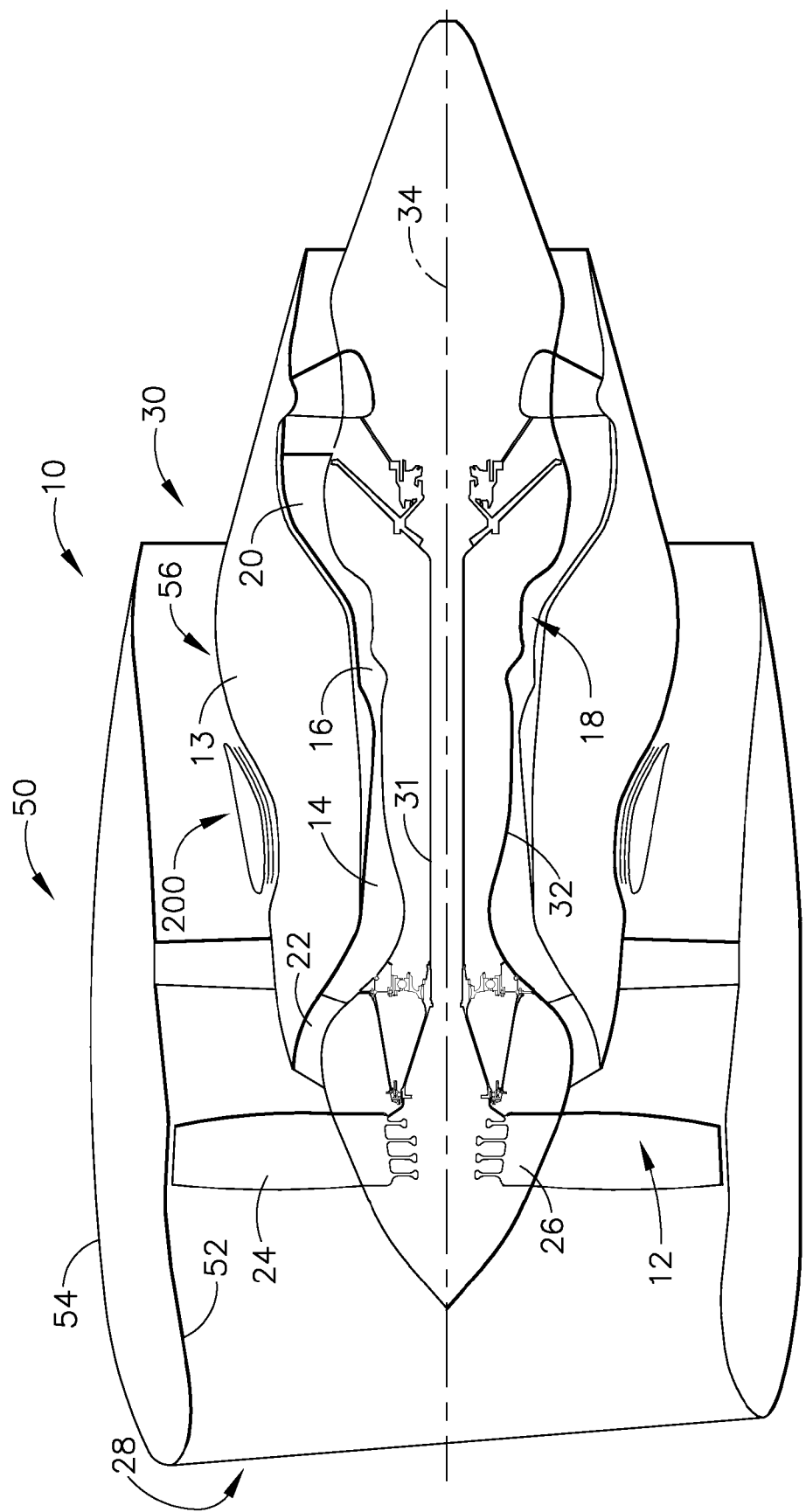
FIG. 5 is a schematic view of the gas turbine engine shown in FIG. 1 including an exemplary heat exchanger coupled to a core engine casing.
Figure 6:
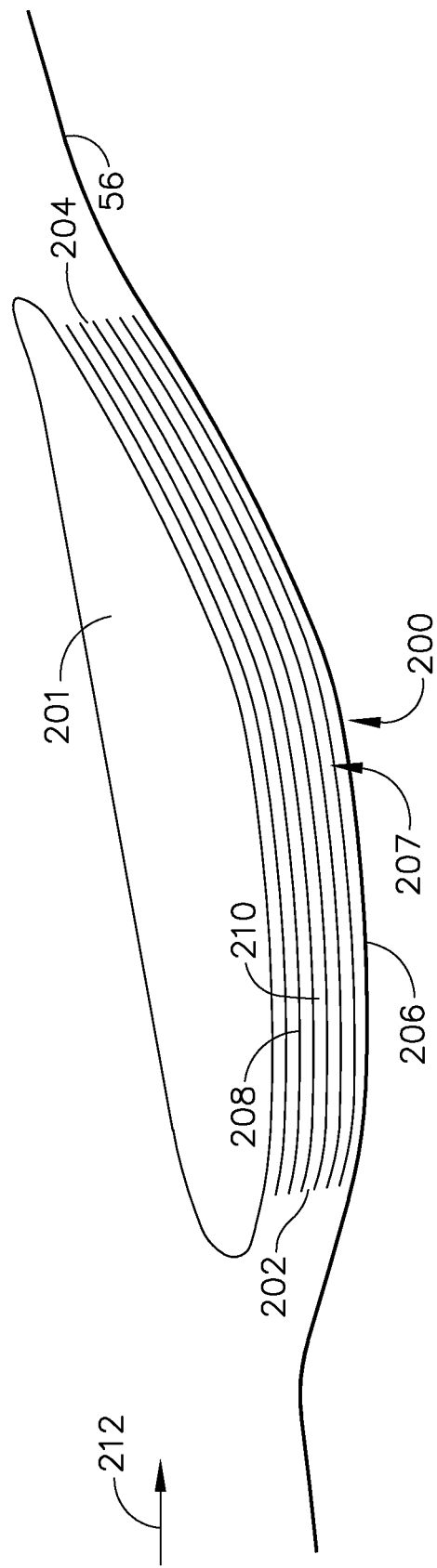
FIG. 6 is an enlarged schematic view of a portion of the heat exchanger shown in FIG. 5.

FIG. 5 is a schematic view of gas turbine engine 10 including an exemplary heat exchanger 200 that is coupled to core engine casing 56. FIG. 6 is an enlarged schematic view of heat exchanger 200. In the exemplary embodiment, heat exchanger 200 is coupled between engine casing 56 and an attachment apparatus 201 that retains heat exchanger 200 against engine casing 56.

In the exemplary embodiment, heat exchanger 200 includes an inlet 202, an outlet 204, and a curvilinear body 206 that extends between inlet 202 and outlet 204. Specifically, curvilinear body 206 extends between inlet 202 and outlet 204 such that at least one curved portion 207 is defined in curvilinear body 206. In the exemplary embodiment, and in contrast to other known heat exchangers, inlet 202 and outlet 204 are coupled to core engine casing 56 without an inlet plenum or an outlet plenum. In the exemplary embodiment, fabricating heat exchanger 200 without an inlet plenum or an outlet plenum enables heat exchanger 200 to be coupled to engine 10 without adding as much weight to engine 10 as other known heat exchangers add. Further, fabricating heat exchanger 200 without an inlet plenum and/or an outlet plenum reduces an amount of drag within heat exchanger 200, thereby increasing an amount of heat exchange within heat exchanger 200.

A plurality of curvilinear heat exchanger elements 208 extend through curvilinear body 206. More specifically, heat exchanger elements 208 each extend from inlet 202 to outlet 204, and as such, a plurality of passageways 210 are defined between adjacent pairs of heat exchanger elements 208. In one embodiment, heat exchanger elements 208 and passageways 210 are each formed with a curvilinear shape that is substantially similar to the curvilinear shape of curvilinear body 206. In another embodiment, at least one of a size, an orientation, and a relative location of each heat exchanger element 208 is variable. Moreover, in each embodiment, heat exchanger 200 has a smaller volume than known heat exchangers, and as such, adjacent pairs of heat exchanger elements 208 are positioned closer together than in known heat exchangers. Accordingly, passageways 210 are narrower than in known heat exchangers.

In the exemplary embodiment, during operation, oil from engine 10 is channeled through heat exchanger elements 208, and airflow 212 discharged from fan assembly 12 is channeled though heat exchanger 200. In an alternative embodiment, airflow 112 is outboard or ambient air. In contrast to known heat exchangers, airflow 212 is channeled directly into heat exchanger 200 without passing through an inlet plenum or a diffuser. In the exemplary embodiment, airflow 212 is channeled directly into inlet 202 and through passageways 210 to facilitate heat exchange between the oil and airflow 212.

Specifically, the oil is cooled as airflow 212 passes through passageways 210 and past heat exchanger elements 208. Spent airflow 212 is discharged from heat exchanger 200 through outlet 204 without passing through an outlet plenum and is discharged back onto core engine casing 56.

In the exemplary embodiment, as airflow 212 is channeled through heat exchanger 200, passageways 210 facilitate increasing an amount of heat exchange between airflow 212 and the oil. Specifically, passageways 210 are narrow, and therefore, enable a greater amount of contact between heat exchanger elements 208 and airflow 212 while requiring less airflow for heat exchange than in known heat exchangers. Moreover, the curvilinear shape of heat exchanger 200 enables airflow 212 to flow within passageways 210, thereby increasing contact between airflow 212 and heat exchanger elements 208. In addition, airflow 212 is not diffused or channeled through an inlet plenum while being channeled into heat exchanger 200. Accordingly reverse flow losses, aerodynamic losses, and pressure losses of airflow 212 are facilitated to be reduced within heat exchanger 200. Specifically, in one embodiment, reverse flow losses, aerodynamic losses, and pressure losses of airflow 112 are facilitated to be reduced by as much as 20%.

Accordingly, for the reasons given above, heat exchanger 200 facilitates improving an efficiency of engine 10 thereby reducing time and/or costs associated with maintaining engine 10.

In one embodiment, a method of assembling a turbine engine is provided. The method includes providing a heat exchanger having a curvilinear body. The method also includes coupling the heat exchanger to at least one of a fan casing and an engine casing of the turbine engine. The curvilinear body facilitates reducing pressure losses in airflow channeled into the heat exchanger. In one embodiment, the heat exchanger is coupled to at least one of the fan casing and the engine casing without an outlet plenum. Accordingly, the airflow is discharged directly from the heat exchanger without passing through an outlet plenum. In another embodiment, the heat exchanger is coupled to at least one of a fan casing and an engine casing of the turbine engine without an inlet plenum. Accordingly, the airflow is channeled directly into the heat exchanger without passing through an inlet plenum. In yet another embodiment, the heat exchanger is coupled to at least one of a fan casing and an engine casing of the turbine engine without a diffuser. Accordingly, the airflow is channeled into the heat exchanger without passing through a diffuser.

In one embodiment, the method also includes extending a plurality of curvilinear heat exchanger elements through the curvilinear body; and varying at least one of a size, orientation, and relative location of each heat exchanger element. In one embodiment, varying at least one of a size, orientation, and relative location of each heat exchanger element facilitates increasing an amount of contact between the airflow and the heat exchanger elements. In another embodiment, providing a heat exchanger having a curvilinear body facilitates reducing an amount of air required to cool oil flowing through the heat exchanger elements.

The above-described systems and methods facilitate increasing heat transfer within a turbine engine heat exchanger. Specifically, the amount of heat transfer is increased because of the combination of curvilinear passages formed within the heat exchanger and the lack of an inlet plenum and/or an outlet plenum. Because of the lack of an inlet plenum, airflow into the heat exchanger is less diffused, and as such, pressure losses are reduced within the heat exchanger. Accordingly, the combination causes a greater amount of airflow to come in contact with the heat exchanger elements that extend through the heat exchanger. As such, the above-described heat exchanger provides a greater volume of heat exchange, while requiring less material and weight than known heat exchangers. Accordingly, the above-described heat exchanger facilitates improving an efficiency of the turbine engine thereby reducing time and/or costs associated with maintaining the turbine engine.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for exchanging heat in a turbine engine are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, those skilled in the art will recognize that the invention can be practiced with modification within the spirit and scope of the claims.

What is claimed is:

1. A method of manufacturing a turbine engine, said method comprising:
providing a heat exchanger having a curvilinear body, an inlet, and an outlet;
extending a plurality of heat exchanger elements through the curvilinear body such that a curvilinear airflow passageway is defined between adjacent heat exchanger elements, wherein each passageway is substantially parallel to the plurality heat exchanger elements, and wherein each heat exchanger element includes an inlet coupled to the heat exchanger inlet and an outlet coupled to the heat exchanger outlet such that each heat exchanger element extends from the heat exchanger inlet to the heat exchanger outlet and includes at least one curved portion; and
coupling the heat exchanger to at least one of a fan casing and an engine casing of the turbine engine, wherein each of at least one of the fan casing and the engine casing include a curvilinear passage substantially similar in shape to the curvilinear body, the curvilinear body extending through at least one of the curvilinear passages, wherein the curvilinear body facilitates reducing pressure losses in airflow channeled into the heat exchanger.

2. A method in accordance with claim 1, wherein said coupling the heat exchanger comprises coupling the heat exchanger to at least one of the fan casing and the engine casing without an outlet plenum, such that the airflow is discharged directly from the heat exchanger without passing through an outlet plenum.

3. A method in accordance with claim 1, further comprising coupling the heat exchanger to at least one of a fan casing and an engine casing of the turbine engine without an inlet plenum, such that airflow is channeled directly into the heat exchanger without passing through an inlet plenum.

4. A method in accordance with claim 1, further comprising varying at least one of a size, orientation, and relative location of each heat exchanger element.

5. A method in accordance with claim 4, wherein varying at least one of a size, orientation, and relative location of each heat exchanger element facilitates increasing an amount of contact between the airflow and the heat exchanger elements.

6. A method in accordance with claim 4, wherein providing a heat exchanger having a curvilinear body facilitates reducing a volume of air required to cool oil flowing through the heat exchanger elements.

7. A method in accordance with claim 1, further comprising coupling the heat exchanger to at least one of a fan casing and an engine casing of the turbine engine without a diffuser, such that the airflow is channeled into the heat exchanger without passing through a diffuser.

8. A heat exchanger for a turbine engine, said heat exchanger comprising:
an inlet and an outlet;
a curvilinear body extending between said inlet and said outlet, said curvilinear body configured to reduce pressure losses in airflow channeled into said heat exchanger, wherein said curvilinear body extends through a curvilinear passage defined in at least one of a fan casing and an engine casing, said curvilinear body being substantially similar in shape to said curvilinear passage; and
a plurality of heat exchanger elements extending through said curvilinear body such that a curvilinear airflow passageway is defined between adjacent said heat exchanger elements, wherein said passageway is substantially parallel to said heat exchanger elements, and wherein each said heat exchanger element includes an inlet coupled to said heat exchanger inlet and an outlet coupled to said heat exchanger outlet such that each heat exchanger element extends from said heat exchanger inlet to said heat exchanger outlet and comprises at least one curved portion.

9. A heat exchanger in accordance with claim 8, wherein said heat exchanger outlet is configured to couple to at least one of said fan casing and said engine casing of the turbine engine without an outlet plenum, such that the airflow is discharged directly from said heat exchanger without passing through an outlet plenum.

10. A heat exchanger in accordance with claim 8, wherein said heat exchanger inlet is configured to couple to at least one of said fan casing and said engine casing of the turbine engine without an inlet plenum, such that the airflow is channeled directly into said heat exchanger without passing through an inlet plenum.

11. A heat exchanger in accordance with claim 8, wherein at least one of a size, orientation, and relative location of each said heat exchanger element is variable.

12. A heat exchanger in accordance with claim 11, wherein each said heat exchanger element is configured to vary in size, orientation, and relative location to increase an amount of contact between the airflow and said heat exchanger elements.

13. A heat exchanger in accordance with claim 11, wherein said curvilinear body is configured to reduce a volume of air required to cool oil flowing through said heat exchanger elements.

14. A heat exchanger in accordance with claim 8, wherein said heat exchanger is configured to couple to at least one of said fan casing and said engine casing of the turbine engine without a diffuser such that the airflow is channeled into said heat exchanger without passing through a diffuser.

15. A turbine engine comprising:
an engine casing;
a fan casing coupled to and positioned radially outward from said engine casing, wherein each of said engine casing and said fan casing include a curvilinear passage defined therein; and
a heat exchanger configured to couple to at least one of said fan casing and said engine casing, said heat exchanger comprising:
an inlet and an outlet;
a curvilinear body extending between said inlet and said outlet and through at least one of said curvilinear passages, said curvilinear body being substantially similar in shape to at least one of said curvilinear passages, said curvilinear body configured to reduce pressure losses in airflow channeled into said heat exchanger; and
a plurality of heat exchanger elements extending through said curvilinear body such that a curvilinear airflow passageway is defined between adjacent said heat exchanger elements, wherein said passageway is substantially parallel to said heat exchanger elements, and wherein each said heat exchanger element includes an inlet coupled to said heat exchanger inlet and an outlet coupled to said heat exchanger outlet such that each heat exchanger element extends from said heat exchanger inlet to said heat exchanger outlet and comprises at least one curved portion.

16. A turbine engine in accordance with claim 15, wherein said heat exchanger outlet is configured to couple to at least one of said fan casing and said engine casing without an outlet plenum, such that the airflow is discharged directly from said heat exchanger without passing through an outlet plenum.

17. A turbine engine in accordance with claim 15, wherein said heat exchanger inlet is configured to couple to at least one of said fan casing and said engine casing without an inlet plenum, such that the airflow is channeled directly into said heat exchanger without passing through an inlet plenum.

18. A turbine engine in accordance with claim 15, wherein at least one of a size, orientation, and relative location of each said heat exchanger element is variable.

19. A turbine engine in accordance with claim 18 wherein said curvilinear body is configured to reduce a volume of air required to cool oil flowing through said heat exchanger elements.

20. A turbine engine in accordance with claim 15, wherein said heat exchanger is configured to couple to at least one of said fan casing and said engine casing without a diffuser such that the airflow is channeled into said heat exchanger without passing through a diffuser.

\* \* \* \* \*